United States Patent Office 3,577,378
Patented May 4, 1971

3,577,378
GLASS FIBER REINFORCED POLYCARBONATES
Hugo Streib and Wilhelm Hechelhammer, Krefeld-Bockum, Germany, assignors to Farbenfabriken Bayer Aktiengesellschaft, Leverkusen, Germany
No Drawing. Continuation-in-part of application Ser. No. 439,082, Mar. 11, 1965. This application Sept. 9, 1968, Ser. No. 758,614
Claims priority, application Germany, Mar. 12, 1964, F 42,281
Int. Cl. C08g 51/10
U.S. Cl. 260—37
8 Claims

ABSTRACT OF THE DISCLOSURE

The invention meets with a process for the production of glass fiber reinforced polycarbonates by introducing milled, filamentized, water-sized glass fibers into a solution or a melt of polycarbonate resin, removing the solvent if necessary and extruding the glass fiber containing melt through a nozzle.

---

This is a continuation-in-part application of application Ser. No. 439,082, filed Mar. 11, 1965, and now abandoned by Hugo Streib and Wilhelm Hechelhammer.

It is known that the mechanical properties of thermoplastic synthetic resins can be considerably improved by the addition of glass fibers. In particular, the tensile strength and the bending strength as well as the thermal stability of the synthetic resins are significantly increased. Glass fiber-reinforced thermoplastic synthetic resins of this type are, therefore, especially suitable for the production of technical molded articles which are mechanically stressed at comparatively high temperatures, such as crank gears, cog wheels, components of electrical devices and the like. Furthermore, in the case of polyamides, the otherwise strongly marked dependence of the mechanical properties on the water content is substantially removed by the addition of glass fibers.

It has heretofore been suggested to produce glass fiber-reinforced thermoplastic synthetic resins by impregnating glass fiber strands, particularly rovings, with the molten resin and, after cooling, chopping the strands or rovings to granulates.

Glass strands are composed of about 200, for example 204, parallel individual continuous glass fibers having a few microns diameter. The individual fibers are always sized with natural or synthetic polymers, such as starch, gelatine, chromium complex compounds, reaction products of unsaturated polyamides with epoxy resins, butadiene-styrene-copolymers, silanes and the like, optionaly in admixture with polyvinyl alcohol, plasticizers, anti-statics and lubricating agents. The glass fibers must be sized in order to decrease their brittleness and to bind them together, thus forming the strands (see for instance the books "Glass Reinforced Plastics," edited by Phillip Morgan, M.A., Iliffe & Sons Ltd., London SE I, first published 1954, pages 2 to 3, and "Fiberglas Reinforced Plastic" by Ralph H. Sonneborn, first edition 1954, Reinhold Publishing Corporation, New York, pages 18 to 19).

Rovings are made by gathering a member of continuous filament strands and winding them on a cylindrical package. The most commonly used rovings consist of about 60 parallel strands of continuous rovings and provide high unidirectional strands (see U.S. Pat. 3,164,563, column 2, lines 62 and 64, and the leaflet of "Textile Fiber Material for Industry" of Owens-Corning Fiberglas Corporation, Toledo 1, Ohio, publication number 1–GT–1375, page 32).

By another method the continuous filament strands or rovings as described above are chopped to uniform lengths (see U.S. Pat. 3,164,563, column 2, line 65 to column 3, line 2, and the leaflet, page 33). Such chopped strands are introduced into the resin melts, distributed therein and the melt is then extruded by a nozzle.

Chopped continuous filament strands and chopped rovings are commercially available in ¼, ½, ¾, 1, 1¼, 1½, 2, 3 and 3¼ inches (see U.S. Pat. 3,164,563, column 6, lines 65 to 67, and the leaflet, page 33).

If granulates are made from such extruding materials they contain preponderantly also parallel glass fibers and when processed in a simple injection molding machine, such as a machine with piston plastification, accumulations of glass fibers frequently occur in the nozzle of the injection molding machine, whereby the glass fibers reach the injection molded bodies only partially and very non-uniformly. A uniform distribution of the glass fibers in the molded body cannot be achieved with granulates of this type, especially in the production of large molded bodies. The glass fibers are present in the form of non-dispersed flocks and frequently even form a part of the surface, so that useless molded bodies are obtained.

In addition, in the case of high molecular weight thermoplastic polycarbonates the commercially available glass fibers are not suitable for reinforcing molded articles due to the fact that the sizings applied to these glass fibers as mentioned above cause decomposition and discoloration of the polycarbonates when heated.

It is, therefore, an object of this invention to provide an improved polycarbonate containing glass fibers. Another object of this invention is to provide an improved polycarbonate containing glass fibers which is substantially free of discoloration. A further object of this invention is to provide an improved polycarbonate containing glass fibers which is stable to heat. A still further object of this invention is to provide an improved injection molding compound based on polycarbonates containing highly distributed glass fibers.

The foregoing objects and others will become apparent from the following description and are accomplished in accordance with the invention, generally speaking, by providing a high molecular weight polycarbonate containing milled, filamentized glass fibers having an average diameter between about 3 to about 15 microns and a maximum length from about 0.05 to about 5 mm. which are free of commonly used sizings as mentioned above.

We have found that the aforementioned difficulties and disadvantages are avoided and useful glass fiber containing granulates are obtained by the incorporation of said milled, filamentized glass fiber material in thermoplastic polycarbonate by introducing the glass fibers into a solution or melt thereof and extruding the mixture in the usual manner in the form of bristles and thereafter comminuting the latter to form granulates. Such granulates can then be worked up in the usual manner, for example, by means of injection molding to give molded articles.

Milled fabrics are made by hammermilling continuous filament strands and form soft pellets of individual filamentized glass fibers. They are commercially available with maximum lengths of ¹⁄₃₂, ¹⁄₁₆, ⅛ and ¼ inch. They may be also sized by the usual sizings, however, these milled fibers are the sole fiber products suitable for reinforcing resins which are also available without such a size, but are rather sized by pure water only (see leaflet, the bottom of page 33).

Therefore, there are some elemental and critical differences between chopped strands or rovings and milled fibers: Chopped strands or rovings are always sized with polymers which are damageous for polycarbonates as mentioned above; milled fibers may have a water size being free of such damageous compounds. Chopped strands consist of about 200 and chopped rovings of about 60. 200 parallel individual filaments, in both cases bound together by the size; milled fibers consist of pellets of highly entangled individual filaments. The length of the chopped strands and rovings is uniform; the length of the individual filaments of the milled fibers vary from merely 0 up to the maximum length.

When the pellets of the milled fibers are mixed with a solution or a melt of a polycarbonate, surprisingly they are readily disentangled and rapidly and uniformly distributed within the solution or melt.

It had to be assumed that the very short fibers which are present in the pellets of the milled fibers would interfere with the reinforcing effect of the longer fibers. However, this is not the case.

Furthermore, it had to be assumed that the water size of the milled fibers would decompose the polycarbonate at higher temperatures since polycarbonates, as a rule, are hydrolyzed under reduction of their average molecular weight if they contain more than abut 0.01 percent by weight of water and are heated above the melting point (s., for instance, British Patent specification No. 841,652 and "Plastics Technology," February 1964, page 32); it is surprising that such a degradation of the polycarbonates practically does not take place by incorporating the water-sized glass fibers mentioned above. If, for example, 30 parts by weight of such fibers containing about 0.1 percent by weight of water, are added to 70 parts by weight of a polycarbonate, about 0.04 percent by weight of water are introduced to the resin. From such a mixture a granulate was produced and from the granulate test samples were injection molded. In both processes the melt temperature amounted to about 300° C. The relative viscosities of the bisphenyl-A polycarbonate, measured in a 0.5 percent methylene chloride solution at 25° C., the diminution of which corresponds to the degradation of the average molecular weight of the polycarbonate, are given in the following table:

|  | Viscosities | |
| --- | --- | --- |
|  | 70 parts by weight of polycarbonate plus 30 parts by weight of glass fibers [1] | Polycarbonate plus 0.04 percent of water |
| Starting polycarbonate | 1.31 | 1.31 |
| Granulate | 1.29 | 1.24 |
| Test sample | 1.27 | 1.18 |

[1] 0.1 percent of water.

The introduction and distribution of the glass fiber material may be combined with the production of the polycarbonate. Thus, in a continuous or discontinuous process for the production of the resin, the glass fiber material can be added to the solvent, monomers, precondensates and melts. Surprisingly, according to the process of the present invention, glass fiber-containing polycarbonate granulates may be obtained from an extruder in which the glass fibers having a maximum length of from about 0.05 to about 5 mm. are substantially undamaged and completely uniformly distributed therethrough.

The process according to the present invention can, for example, be carried out with advantage in an extruder by introducing the glass fiber material into the melt at a point along the worm at which the polycarbonate is not under pressure, through any suitable opening, for example, through one of the usual degassing pipe sockets. The mixing of the glass fiber material with the resin takes place subsequently thereto in the further course of the mixture through the extruder. However, the glass fibers may also be introduced into the melt in other devices which enable a uniform mixing of the glass fiber material with the molten resin.

If an extruder is used, the polycarbonate can be introduced into the mixing device, for example, as granulate or powder and in a molten state. The latter method is used with advantage when the polycarbonate, after its production, is already present as a melt and can be directly further processed.

Accumulations of glass fibers in the nozzle of the injection molding machine or non-dispersed flocks in the injection molded part do not occur with the thermal processing of the glass fiber-containing granulates produced according to the process of the present invention in all the usual injection molding machines. On the contrary, injection molded bodies are obtained in which the glass fibers are completely uniformly distributed. In contradistinction to glass fiber-containing granulates produced according to the prior art processes, the glass fibers form, in the polycarbonate granulate, a substantially more uniform and denser felt, whereby the molding problems heretofore present are avoided.

Therefore, injection molded bodies made from granulates produced according to the process of the present invention exhibit very good and, in particular, uniform strength properties. Furthermore, with the help of the granulates produced by the process according to the present invention, injection molded bodies are obtained, the surfaces of which are especially smooth and uniform so that the subsequent provision of many color shades is possible by the addition of suitable dyestuffs to the synthetic resin.

A further advantage of the process according to the present invention consists in permitting the incorporation of glass fibers even into melts of especially high viscosity so that the polycarbonate granulates produced can also be used for the production of semi-finished articles, such as pipes, rods and the like, and even for the production of large blown bodies from correspondingly highly viscous polycarbonate melts.

By high molecular weight polycarbonates we mean to include polycondensation products of organic dihydroxy compounds, preferably aromatic dihydroxy compounds, especially bis-hydroxy-aryl-alkanes, sulfones, ethers, sulfides, sulfoxides, with polycarbonate-forming carbonic acid derivatives such as phosgene, bis-chloro-carbonic acid esters of aromatic dihydroxy compounds and diesters of carbonic acids.

Any suitable polycarbonate and preferably a polyarylcarbonate and most preferably mixed polyarylcarbonates may be used in accordance with the present invention. Suitable polycarbonates are disclosed in, for example, U.S. Patent 3,028,365; British Patent 808,485; German Patent 1,007,996; U.S. Patent 2,997,459; British Patent 772,627; British Patent 808,486 and British Patent 808,487. As is evident from the patents, polycarbonates and preferably polyarylcarbonates to be employed in accordance with the present invention may be produced from aromatic phenols, especially alkylidene bisphenols, alkylidene bishydroxy cycloalkanes, bis(hydroxyphenyl)ethers, bis(hydroxyphenyl)sulfides, bis(hydroxyphenyl)sulphones, bis(hydroxyphenyl)-sulfoxides and the like. It is also possible to use polycarbonates based on mixtures of the foregoing bisphenols and the like with aromatic, aliphatic or cycloaliphatic dihydroxy compounds. In accordance with a preferred embodiment of the present invention, it has been found that polycarbonates based on beta-alkenyl substituted aromatic dihydroxy compounds, especially those polyarylcarbonates where the beta-alkenyl substituted aromatic dihydroxy compound amounts to up to about 25 mol percent of the total aromatic dihydroxy compound may be employed. Such high molecular weight polyarylcarbonates are disclosed in Belgium Patent 554,222. They can be produced by reacting a suitable mixture of a bisphenol such as 2,2-bis-(4-hydroxyphenyl)propane with up to about 25 mol percent of the total requirement of the phenol compound of a beta-alkenyl substituted aromatic dihydroxy compound such as 3-monodiallyl-4,4'-dihydroxy diphenyl or the like.

If the polycarbonate is prepared directly from phosgene and a bisphenol, it is satisfactory to dissolve the bisphenol in aqueous caustic as disclosed in German Patent 959,497 and form a polymer by introduction of phosgene. By combining the aqueous caustic solution with a solvent for the polymer, a growing polymer chain dissolves in the organic phase and the ionic ends continue to grow in the aqueous phase. After removal of the water and solvent a high grade polymer having an intrinsic viscosity of about 0.5 to about 1.5 in dioxan at 30° C. in essentially quantative yield is obtained. Alternately, the polycarbonate may be produced by the transesterification route wherein a diarylcarbonate is reacted with a dihydroxy aromatic compound under conditions which favour the removal of the phenolic by-products in a well-stirred vacuum kettle. The polycarbonates are well known and the foregoing is set forth to aid in understanding the type of polycarbonates which are most suitable for use in accordance with the present invention.

In the process, any suitable aromatic dihydroxy compound may be used such as, for example, hydroquinone, resorcinol, pyrocatechol, 4,4'-dihydroxy diphenyl, 1,5-dihydroxy naphthylene, alkylidene bis-phenols, di(hydroxy phenyl)ethers, di(hydroxy phenyl)sulfides, di(hydroxy phenyl)sulfoxides, di(hydroxy phenyl)sulfones and the like; ethylene glycol, diethylene glycol, polyethylene glycol 400, thiodiglycol, ethylene dithiodiglycol, propane diol-1,2, propane diol-1,3, butane diol-1,3, butane diol-1,4, 2-methylpropane diol-1,3, pentane diol-1,5, hexane diol-1,6, octane diol-1,8, 2-ethyl hexane diol-1,3, decane diol-1,10, quinitol, cyclohexane diol-1,2, o, m and p-xylene glycol, 2,2-bis(4-hydroxy cyclohexyl) propane, bis-(4-hydroxy cyclohexyl)methane, 2,6-dihydroxy decahydronaphthylene. Typical of the beta-alkenyl substituted aromatic dihydroxy compounds are mono- and diallyl and -methallyl hydroquinone, 3-mono- and 3,3'-diallyl and -methallyl-4,4'-dihydroxy diphenyl, 3-mono and 3,3'-diallyl and -methallyl compounds of bis(4-hydroxy phenyl) alkanes such as bis(hydroxy phenyl) methane, ethane, propane, butane, cyclohexane and the like as well as the bis(4-hydroxy phenyl)ethers, sulfides, sulfoxides and sulfones.

The amount of glass fiber material to be added to the thermoplastic resin depends mainly upon the properties of the thermoplastic synthetic resin and upon its intended use. It is frequently sufficient to add to the thermoplastic resin from about 2 to about 60 percent by weight of glass fiber material, preferably from about 5 to about 50 percent by weight of glass fiber material. The use of smaller or greater amounts is, of course, possible, but generally an amount of from about 10 to about 40 percent by weight is sufficient.

The granulates produced according to this invention can be worked up according to the usual processes, for example, molding, injection molding or extruding, to form molded articles having excellent properties.

It will be understood that the injection molding composition provided by this invention may be blended with other molding compounds in the conventional manner. The percentage by weight of glass fibers in the composition fed to the injection molding machine may also be varied by blending the glass filled compound with standard molding compositions according to the well understood techniques of the art.

This invention is further illustrated but is not intended to be limited by the following examples in which all parts and percentages are by weight unless otherwise specified.

EXAMPLE 1

Into 200 parts by weight of a 5 percent by weight bisphenol-A polycarbonate solution in methylene chloride (relative viscosity 1.300) there is added 1 part by weight of pellets of about 5 to 10 mm. diameter of milled filamentized water-sized glass fibers (average diameter about 10 microns, maximum length about 0.25 mm., water content about 0.1 percent by weight). After about 30 seconds the fibers are completely dispersed in the solution. In periods of 1 minute the addition of 1 part by weight of fibers is twice repeated. Each time the fibers are dispersed within 30 seconds.

The solvent of the solution is then evaporated in an extruder and the solvent-free, glass fiber containing polycarbonate is worked up to a granulate. The glass fibers are randomly but completely uniformly distributed in the granulate. Upon again melting and molding the granulate to form injection molded parts, finished products are obtained in which the glass fibers are also randomly, but completely uniformly distributed.

EXAMPLE 2

The process of Example 1 is repeated with a 10 percent methylene chloride solution of the same polycarbonate. Into 200 parts by weight of the solution 2.4 parts by weight of the pellets of the glass fibers, as described in Example 1, are added under stirring. The fibers are wholly distributed in the solution within 30 seconds. The addition of the 2.4 parts by weight of the glass fiber pellets is twice repeated. The solution is then worked up as described in Example 1. Finished products are obtained in which the glass fibers are randomly but uniformly distributed.

EXAMPLE 3

A polycarbonate from bis-(4-hydroxyphenyl)-dimethyl-methane with a relative viscosity of 1.31, measured in a 0.5% solution in methylene chloride at 25° C., in granulate form is continuously melted in a worm extruder and extruded through a nozzle as a bristle. The latter is passed round a rotating, water-cooled roller and then comminuted to a granulate.

Through a wide feed pipe near the exit nozzle, there are fed in, likewise continuously, pellets of about 5 to 10 mm. diameter of milled filamentized glass fiber having an average diameter of about 10 micron and a maximum length of about 0.25 mm. and having a water size (water content about 0.1 percent by weight), in such an amount that the mixture contains about 30% by weight of glass fiber material.

The glass fibers are randomly but completely uniformly distributed in the granulate. Upon again melting and molding the granulate to form injection molded parts, finished products are obtained in which the glass fibers are also randomly, but completely uniformly distributed.

This process is repeated several times but the amount of the glass fiber material added to the polycarbonate melt is varied in such a manner that products are obtained containing 10, 15, 20, and 40 percent by weight of glass fiber.

In the following table the alteration of the impact strength and of the E-modulus by varying the glass fiber content of the products is given:

| Glass fiber content, percent by weight: | | Impact strength, kp. cm./cm.$^2$ | E-modulus, kp./cm.$^2$ | |
|---|---|---|---|---|
| 0 | Unbroken | | 22,000 | 0 |
| 10 | do | | 29,000 | 10 |
| 15 | 90 to 110 | | 37,000 | 15 |
| 20 | 60 to 65 | | 46,000 | 20 |
| 30 | 40 to 45 | | 70,000 | 30 |
| 40 | 30 | | 100,000 | 40 |

The impact strength is measured according to DIN No. 453 453, the E-modulus is measured according to DIN 53 455.

Other additives which may be added to the polycarbonate are glass powder, quartz products, fillers of all kinds, such as graphite or molybdenum disulphide; powders of high melting synthetic resins, such as polytetrafluoroethylene and related products; natural fibers, such as cotton, sisal, asbestos, and/or synthetic fibers, metal threads, metal powders, pigments and dyestuffs, which are stable during the residence in the melt of the polycarbonates and do not perceptibly damage the polycarbonates; stabilizers against the action of heat and ultraviolet rays; additives for further increasing the tensile strength, and the like.

The invention provides a thermoplastic material, particularly a polycarbonate, which is non-yielding and rigid even at elevated temperatures. The non-yielding fiber glass filler sustains an applied load and prevents localized overloading, cracking or straining and resultant crazing observed in unfilled polycarbonate. This characteristic makes the material useful in the field of nuts, bolts, inserts, vibration proof connectors as well as pressure vessels and parts. Thus, there can be produced with advantage, construction parts of electrical devices and equipment such as contact carriers, high tension coil formers, high frequency coils, relay parts and printed circuits.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for preparing glass fiber reinforced polycarbonates which comprises introducing highly entangled pellets of milled, filamentized, water-sized glass fibers into a solution of the polycarbonate whereby said pellets are readily disentangled and the individual fibers are rapidly and uniformly distributed in the solution, removing the solvent and thereafter extruding the fiber-containing polycarbonate melt.

2. A process for preparing glass fiber reinforced polycarbonates which comprises introducing highly entangled pellets of milled, filamentized, water-sized glass fibers into molten polycarbonate whereby said pellets are readily disentangled and the individual fibers rapidly and uniformly distributed in the melt and extruding the fiber-containing polycarbonate melt.

3. The process of claim 1, wherein the glass fiber is in an amount of between about 2 to about 60 percent by weight.

4. The process of claim 2, wherein the glass fiber is in an amount of between about 2 to about 60 percent by weight.

5. A polycarbonate granulate containing from about 2 to about 60 percent by weight of randomly but uniformly distributed milled filamentized glass fibers sized with water.

6. An article produced from the glass fiber-containing polycarbonate granulate of claim 5.

7. The process of claim 1 wherein the water content of the glass fiber is about 0.1 percent by weight.

8. The polycarbonate granulate of claim 5 wherein the milled glass fibers have an average diameter of from about 3 to about 15 microns and a length of from about 0.05 to about 5 mm.

References Cited

Owens-Corning Fiberglas Corp., Textile Fiber Materials for Industry, Pub. No. 1–GT–1375–C, February 1964, p. 33.

MORRIS LIEBMAN, Primary Examiner

S. M. PERSON, Assistant Examiner

U.S. Cl. X.R.

106—308